Feb. 21, 1967 R. H. MacKAY 3,305,283
CONTAINER AND TRANSPORTATION MEANS FOR
DISTRIBUTING SUCH CONTAINERS
Filed Aug. 9, 1965 2 Sheets-Sheet 1
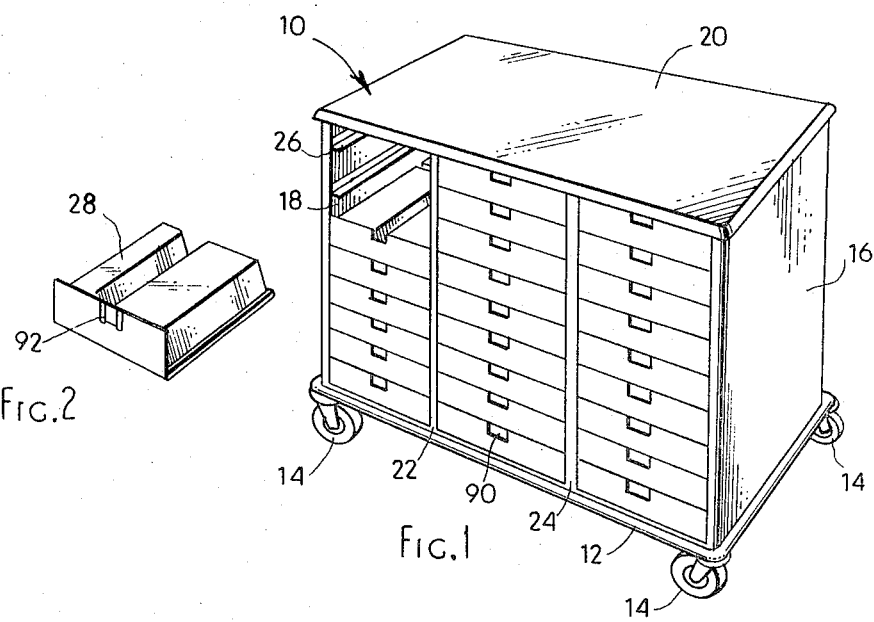
FIG.2
FIG.1
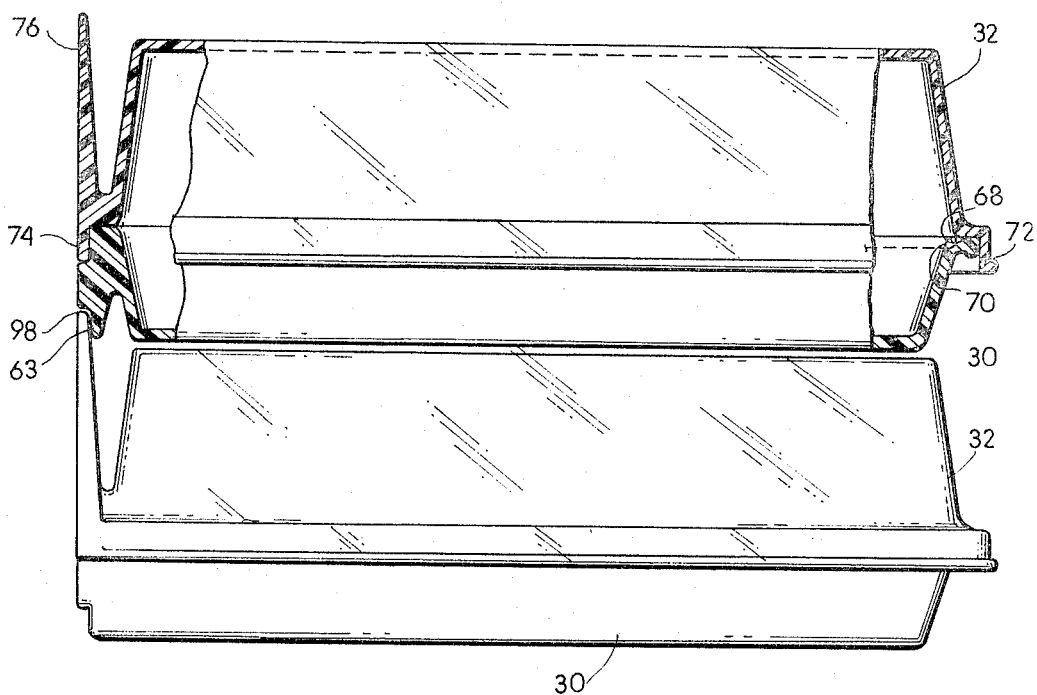
FIG.3
INVENTOR
ROBERT H. MacKAY
by JEFFERS & YOUNG
ATTORNEYS

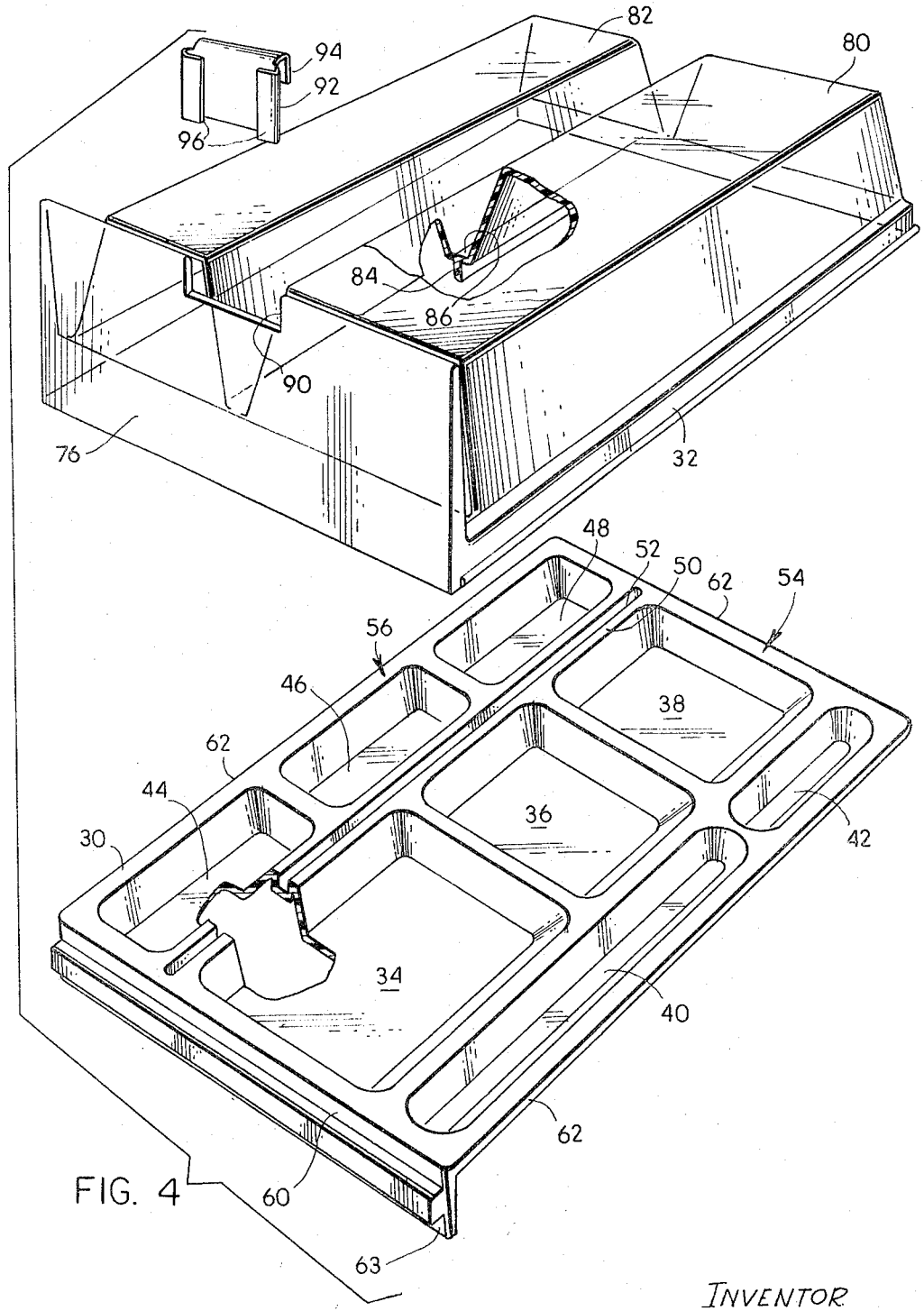

United States Patent Office 3,305,283
Patented Feb. 21, 1967

3,305,283
CONTAINER AND TRANSPORTATION MEANS FOR DISTRIBUTING SUCH CONTAINERS
Robert H. MacKay, Fort Wayne, Ind., assignor to Lincoln Manufacturing Co., Inc., Fort Wayne, Ind., a corporation of Indiana
Filed Aug. 9, 1965, Ser. No. 478,337
5 Claims. (Cl. 312—198)

This invention relates to an improved container, and to a transportation means for distributing such containers. The containers are adapted to contain servings of food within individual sections which are separated into a hot food storage compartment and a cold food storage compartment.

In the serving of hospital patients, nursing home patients, schools and other such similar institutional feedings there is a need for transporting the food by a convenient cart or other transportation means, and then individually dispensing the food servings which need to be stored in heated or cold condition, or both. The practical necessity, for feeding on a substantial scale, so great a number of patients or other consumers, requires that the carts be readily loaded and unloaded, and transported to the point of use.

It is a further requirement, in food dispensing, storage and cartage apparatus of the kind described, that the components be readily cleanable and sterilizable in as efficient and convenient manner as possible.

In many institutional feeding arrangements, the food must be prepared so that individual servings can be rendered in accordance with the dietary requirements of the consumer. Consequently, there is a need for individualized preparing and dispensing in separate containers, according to the preference and need of the consumer.

In the planning and serving of nutritious and attractive meals, some of the foods must be heated and remain heated while others are served cold and hence must be refrigerated. There is a necessity, if such different temperature foods are to be stored and transported for any appreciable distance and to be maintained over any substantial length of time, that the container for such foods must be separated into compartments in order that the cold foods will be separated from the hot foods and both will be insulated to maintain their respective heated and refrigerated conditions.

It is essential, of course, that such compartmentalizing of the foods be accomplished within a container means which is readily cleanable and sterilizable as well as the cart for carrying the food.

When substantial numbers of containers are stacked within a cartage means and are readily inserted and removed, there is a practical danger of losing some of the containers by shifting of the load during transport. This is particularly the case, when one of the very objects of the invention is to produce a cartage means which will admit of ready loading and unloading procedures. It is one of the important objects of the present invention to provide a novel combination of storage-and-carrying means in which, after the containers are loaded within the cartage, they are not readily shifted accidentally so that a part of the containers can be lost during transportation. Instead, the containers are held within the cartage means against accidental shifting. They can nevertheless be easily removed for serving.

It is a further object of the present invention to provide a novel container for storing foods in both refrigerated and heated conditions, and having a panel, which coacts with the panels of the other containers so that once they are loaded within the cartage the combined panels will form an enclosure serving as one of the walls for the cartage means.

It is a still further object of the present invention to provide both a container and cartage means which can be readily and easily cleaned and sterilized, all of the surfaces of these parts being readily accessible for cleaning.

A still further object of the present invention is to provide a novel combination of base and cover forming a container for receiving food portions which can be separated and maintained in refrigerated and heated conditions, said cover being readily removable at the time of serving by disengaging the interlocking edges sealingly combined with coacting edges of said base.

These and other objects and features of the present invention will become apparent from a consideration of the following description, which proceeds with reference to the accompanying drawings, wherein:

FIGURE 1 is an isometric view showing the cartage means loaded with trays;

FIGURE 2 is an isometric view of one of the trays shown removed from the cartage means;

FIGURE 3 is an enlarged view of two of the trays shown as they are stacked in the cartage, a portion of the trays being illustrated in section view to show how they are interlocked when they are in the cartage means; and FIGURE 4 is an exploded view of the cover and base of the serving tray illustrating how it is divided into hot and cold food compartments, a portion of the tray lid being broken away to illustrate how the compartmentalization is effected; and also shows a nameplate holder shown detached from the lid on which it is mounted.

Referring now to the drawings, and particularly to FIGURE 1, there is designated generally by reference numeral 10 a cartage means comprised of a base 12 and a number of canister wheels 14, vertical end walls 16, 18 which are connected by a top wall 20, and partitioning walls 22, 24 dividing the volume of the cartage means into three sections, each of which is adapted to receive a stack of trays from the opposite sides of the cart. Both the end walls, 16, 18 and partitions 22, 24 have horizontally extending, vertically spaced runners 26 which slidably receive thereon trays 28 and provide vertical support for the trays (FIGURE 2). The spacing of the end walls and partitions and the vertical spacing of the runners 26 is so proportioned that the trays 28 will individually rest on pairs of the runners 26. The vertical spacing of the runners 26 is proportioned so that the vertically adjacent trays are interlocked in the manner illustrated in FIGURE 3. The length of the trays is proportioned in relation to the width of the cart so that the trays can be inserted endwise from each of the sides of the cart and they are unloaded from each of the sides.

When the trays are all removed from the cart (FIGURE 1) the sides of the cart are readily cleanable, as well as all other portions of the cart since the surfaces, both interior and exterior, are exposed and readily reachable for cleaning. Consequently, the ease of cleaning makes a more hygienic condition of use and simplifies the maintenance of the equipment. It is indispensable, in hospital, nursing home, cafeteria, school and other institutional use, that the equipment be maintained under rigorous standards of hygiene in order to prevent the occurrence or spread of disease.

Not only is the cartage means readily cleanable but so also are the trays 28 which will next be described in detail.

Referring to FIGURES 3 and 4, the tray 28 consists of a base 30 and cover 32, the base 30 and cover 32 may consist of any suitable plastic, washable material having the desired strength, impact resistance and moldability.

The base 30 includes a number of recesses 34, 36 and 38, which are adapted to receive containers of food therein and oblong recess 40, and a further recess 42 adapted for receiving utensils, condiments and the like. Recesses 34–42 are separated from a second series of recesses 44, 46 and 48 by a rib 50 having a slot 52 formed therein, the purpose of which is to form a partition separating recesses 34–42 into one compartment designated generally by reference numeral 54 from the other recesses 44, 46, 48, as a second compartment and designated generally by reference numeral 56.

The base has a stepped recess 60 along one side and a bead 62 surrounding the three remaining sides of the base.

The base has a depending lip 63 adjoining the recess 60, the purpose of which is to interlock with the adjacent tray in the manner which will be described in connection with the stacking of the trays within the cartage device.

Once the food is placed in the base it is next sealed by the cover 32 having a shoulder 68 which bears sealingly against the margin 70 surrounding the four sides of the base and also includes a flange 72 which is press fitted over the beads 62 surrounding three of the sides of the base. The cover further includes a flange 74 which is press fitted against shoulder 60 and includes an integral panel 76 of tapering cross-section extending upwardly and into engagement with the depending lip 63 of the next higher tray (FIGURE 3) so that the total number of panels 76 forms an enclosure wall insulatingly enclosing the interior of the cartage device 10. The cover has two raised sections 80 and 82 (FIGURE 4) and a base section 86, the purpose of the raised portion being to form a clearance which increases the volumetric capacity containable in the recesses 34–42 in the one compartment 54, and also for increasing the volumetric capacity of compartment 56. The cover has a tongue 84 which extends into the slot 52 and the flat portion 86 engages the flat surface of the rib 50 so that the two compartments 54 and 56 are sealed apart thereby permitting the storage of hot foods and cold foods in the same base but on opposite sides of the partition formed by the combination of tongue 84, slot 52, flat portion 86 and rib 50.

Where the front panel 76 is constructed there is formed a slot 90 (FIGURE 4) proportioned to receive a clip 92 therein, the clip having a folded over edge 94 which is press fitted within the slot 90. The clip has two vertically formed marginal sections 96 wherein can be received a nameplate, room number, or other identification which earmarks proper delivery for the tray of food.

In operation, the covers 32 are initially removed from the base 30 and food of the proper amount and selection is placed in the containers, within recesses 34–48 together with utensils for the food. On one side of the partition 50 in compartment 54 is generally stored the hot food and on the other side of the partition, in compartment 56 is stored the cold food. After the food is so placed, the cover 32 is press fitted over the base, causing the flange 72 to be press fitted over the beads 62 and the lip 74 is press fitted against 60. The clip 92 together with the room number, patient number, or other suitable identification means is press fitted within the slot 90 to properly identify the contents of the tray and its recipient.

The trays are then fitted from opposite sides of the cartage device, being slipped endwise on the runners 26 so that the lateral edges of the base are in engagement with the runners 26 to vertically support the trays. The trays are stacked starting from the top of the cartage device and then proceeding downwardly. For example, referring to FIGURE 1, the uppermost trays in each vertical row are inserted endwise first from the opposite side of the device 10 (there being two trays end to end across the width of the cartage device) and the trays become interlocked with each other as the loading proceeds starting from the top, down. For example, referring to FIGURE 3, the upper edge 98 of panel 76 (FIGURE 3) engages depending lip 63 of the next higher tray and preventing removal of the higher tray. Unloading of the vertical row of trays proceeds in the opposite direction from the loading. The loading commences from the top down and the unloading commences from the bottom up. Because the trays are all interlocked it is less possible for them to become accidentally dislodged from the cart during transportation. Also, as will be seen from FIGURE 1, the panels 76 collectively form a wall for the cart at the opposite sides of the cart thus contributing to insulating the food contents. Consequently, the foods are maintained closer to their original temperature during transportation. When the cart has reached the point of dispensing of the trays, the trays are simply pulled endwise and, according to the information on the clip, are dispensed. At the point of use, the cover is removed by grasping the panel 76 and in pulling the cover off of its interference fitting with the base. The interference fit of the flanges 72 with the lip 68 is relatively easily broken in spite of the fact that the fit is an efficient heat sealing connection. The food at the time of serving on the base of the tray is substantially at its original temperature so that the heated foods in compartment 54 can be eaten at the desired temperature and the cooled foods in compartment 56, separated by partition 50 remain in their refrigerated condition.

After use of the food tray, the cover is again inserted on the base and the cart 10 is loaded with the empty trays and returned for cleaning and refilling. Loading the empty trays is, of course, in the same manner as loading with trays when they are filled with food.

After use, the trays are easily cleaned and the covers are interchangeable with other base members.

Both the cart and the trays are readily cleanable and sterilizable for re-use and the maintenance of both the trays and the cart is relatively simple.

The construction as described is durable and neither the trays nor the cart are readily susceptible to breakage. The plastic material is of a suitable impact resistance and is washable. The plastic material from which the trays can be made, can consist typically of a melamine urea material, this being mentioned not by way of limitation but only by way of example. Other plastic composition materials having the desirable washability, impact resistance and moldability are also usable.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations which incorporate the herein disclosed principles will be included within the scope of the following claims as equivalents of the invention.

What is claimed is:

1. Apparatus for storing and transporting food products, comprising: a plurality of containers each having a base including spaced recesses therein and separation wall, a cover member proportioned to fit sealingly over said base and having outer edges sealingly joined with said base to insulate the space enclosed by said base and cover member, said cover member including a separation wall complementary with the wall of said base to sealingly separate interior portions of said base, and an integral wall section of said cover member projecting across only one side thereof and proportioned to make engagement with the base of a vertically adjacent container when moved in a horizontal direction to form an interlocking stack of said containers.

2. Apparatus for storing and transporting food products, comprising: a plurality of containers each having a base including spaced recesses therein and a separation wall, a cover member proportioned to fit sealingly over said base and having outer edges sealingly joined with said base to insulate the space enclosed by said base and cover member, said cover member including a separation wall complementary with the wall of said base to sealingly separate interior portions of said base, and an integral wall section of said cover member projecting across only one side thereof and proportioned to become engaged along only said one side with the base of a vertically adjacent container when moved in one direction along a horizontal line to form an interlocking stack of said containers and to become disengaged from the base of said vertically adjacent container when moved along said horizontal line in a direction opposite said one direction, said integral wall sections being generally vertically aligned to define an insulation wall which covers the stack of containers.

3. Apparatus for storing and transporting food products, comprising: a plurality of containers each having a base including spaced recesses therein and a separation wall, a cover member proportioned to fit sealingly over said base and having outer edges sealingly joined with said base to insulate the space enclosed by said base and cover member, said cover member including a separation wall complementary with the wall of said base to sealingly separate interior portions of said base, an integral wall section of said cover member projecting across one side thereof and proportioned to extend into engagement with the base of a vertically adjacent container to form an interlocking stack of said containers, said integral wall section being generally vertically aligned to define an insulation wall which covers the stack of containers, and a transportable carriage having end walls and vertically disposed support surfaces which are spaced apart to slidingly receive said containers for support thereon, the vertical spacings between adjacent containers being dimensioned so that the integral projecting wall section extends into interlocking relation with a vertically adjacent container and the plurality of said walls coact to form an interlocking cover for the stack of said containers.

4. The combination of a cart and removable food containers, comprising: a platform having ground supporting wheels thereon, vertical support members on said platform and having vertically spaced support surfaces for said containers, each of said containers being proportioned to fit slidingly endwise on the support surfaces of said support members, and each of said containers having a single side wall with mating surfaces which, upon insertion, interlock to provide an end wall which together with the end walls of the other containers effects an interlocked closure of the internal volume of said cart.

5. The combination of a cart and removable food containers therefor, said cart comprising: a platform having ground supporting wheels thereon, vertical support members mounted on said platform and having vertically spaced support surfaces for said containers, each of said containers being proportioned to be inserted between and fit on the support surfaces of said support members, each of said containers having one vertical wall with upper and lower mating surfaces which, upon insertion, interfit with the lower mating surface of one container in contact with the upper mating surface of the adjacent lower container to provide a vertical wall which together with the vertical walls of the other containers effects a closure on two sides of said cart, and vertical end walls mounted on the ends of said cart and a cover mounted on top of said end walls to effect a complete sealed internal closure for said cart.

References Cited by the Examiner

UNITED STATES PATENTS

| | | | |
|---|---|---|---|
| 731,330 | 6/1903 | Woodruff | 312—320 X |
| 1,336,776 | 4/1920 | Drinkwater | 206—4 |
| 2,339,580 | 1/1944 | Park | 206—4 |
| 2,409,528 | 10/1946 | Baunach | 312—287 X |
| 2,625,456 | 1/1953 | Rostau | 312—270 |
| 3,003,839 | 10/1961 | Bloom | 312—111 |
| 3,016,129 | 1/1962 | King | 206—4 |

CLAUDE A. LE ROY, *Primary Examiner.*

CHANCELLOR E. HARRIS, *Assistant Examiner.*